US009436768B2

(12) United States Patent
Yang

(10) Patent No.: US 9,436,768 B2
(45) Date of Patent: Sep. 6, 2016

(54) SYSTEM AND METHOD FOR PUSHING AND DISTRIBUTING PROMOTION CONTENT

(71) Applicant: TENCENT TECHNOLOGY (SHENZHEN) COMPANY LIMITED, Shenzhen (CN)

(72) Inventor: Pan Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 150 days.

(21) Appl. No.: 14/452,518

(22) Filed: Aug. 5, 2014

(65) Prior Publication Data
US 2015/0032753 A1    Jan. 29, 2015

Related U.S. Application Data

(63) Continuation of application No. PCT/CN2014/074390, filed on Mar. 31, 2014.

(30) Foreign Application Priority Data

Apr. 2, 2013  (CN) .......................... 2013 1 0113608

(51) Int. Cl.
G06F 17/30   (2006.01)
G06F 17/27   (2006.01)

(52) U.S. Cl.
CPC ..... *G06F 17/30876* (2013.01); *G06F 17/2705* (2013.01); *G06F 17/30707* (2013.01); *G06F 17/30719* (2013.01); *G06F 17/30722* (2013.01)

(58) Field of Classification Search
CPC .......................... G06F 17/30; G06F 17/30707
USPC .................................................. 707/600–899
See application file for complete search history.

(56) References Cited

U.S. PATENT DOCUMENTS

2008/0109232 A1* 5/2008 Musgrove .............. G06Q 30/02
                                                         705/317
2011/0282858 A1   11/2011 Karidi
2012/0259859 A1   10/2012 Ishigami

FOREIGN PATENT DOCUMENTS

CN    101520878 A    9/2009
CN    102769818 A    11/2012

OTHER PUBLICATIONS

International Search Report in international application No. PCT/CN2014/074390, mailed on Jun. 30, 2014.

* cited by examiner

*Primary Examiner* — Isaac M Woo
(74) *Attorney, Agent, or Firm* — Syncoda LLC; Feng Ma; Junjie Feng

(57) ABSTRACT

System, methods, and computer-readable medium allow pushing content items based on traffic features. A target text is obtained and analyzed lexically. Features, including traffic feature, are extracted from the target text. Based on a pre-trained hierarchical classification model considering traffic feature, the features extracted from the target text are classified hierarchically to obtain a hierarchical classification of the target text. Based on the hierarchical classification of the target text, one or more are selected among a plurality of content items. The selected content items are obtained and pushed to a terminal.

14 Claims, 10 Drawing Sheets

SYSTEM AND METHOD FOR PUSHING AND DISTRIBUTING PROMOTION CONTENT

CROSS-REFERENCE TO RELATED APPLICATIONS

This is a continuation application of International Patent Application No. PCT/CN2014/074390, filed on Mar. 31, 2014, which claims priority to Chinese Patent Application No. 201310113608.0 filed on Apr. 2, 2013. The disclosures of these applications are hereby incorporated by reference in their entirety.

BACKGROUND

Text classification techniques can be used to classify text into one or more subject matter categories. Text classification/categorization is a research area in information science that is concerned with assigning text to one or more categories based on its contents. Typical text classification techniques are based on naive Bayes classifiers, tf-idf, latent semantic indexing, support vector machines and artificial neural networks, for example.

SUMMARY

In general, one aspect of the subject matter described in this specification can be embodied in a method for pushing content items. A target text is obtained and analyzed lexically. Features, including traffic feature, are extracted from the target text. Based on a pre-trained hierarchical classification model considering traffic feature, the features extracted from the target text are classified hierarchically to obtain a hierarchical classification of the target text. Based on the hierarchical classification of the target text, one or more are selected among a plurality of content items. The selected content items are obtained and pushed to a terminal. Other embodiments of this aspect include corresponding systems, servers, and computer program products.

These and other embodiments can optionally include one or more of the following features. The features extracted from the target text can further include at least one of token, keyword, topic, general keyword, expanded keyword, named entity of the target text.

The target text can comprise a webpage text which comprises a traffic feature identifying source of the webpage text.

The extracting features comprising traffic feature from the target text can comprise: parsing Uniform Resource Locator (URL) of the webpage text; and determining traffic feature of the webpage text based on the URL.

The target text can comprise a user text which comprises a traffic feature identifying source of the user text.

The user text can be associated with a user identity and comprise at least one of a historical search query request item associated with the user identity, a microblog tag associated with the user identity, a webpage title browsed associated with the user identity.

The target text can comprise a promotion text which comprises a traffic feature identifying source of the promotion text.

The plurality of content items can comprise a plurality of promotion texts.

The method can further comprises: for each of the plurality of promotion texts, obtaining the promotion text and analyzing lexically the promotion text; extracting features, comprising traffic feature, from the promotion text; classifying hierarchically, the features extracted from the promotion text, based on a pre-trained hierarchical classification model considering traffic feature to obtain a hierarchical classification of the promotion text; and calculating similarity between the webpage text and the promotion text based on the hierarchical classification of the promotion text and the hierarchical classification of the webpage text, where the selecting one or more among the plurality of promotion texts is based on the similarity between the webpage text and each of the plurality of promotion texts.

The target text can further comprise a user text.

The selecting one or more among the plurality of promotion texts can be further based on the similarity between the webpage text and the user text The details of one or more implementations of the subject matter are set forth in the accompanying drawings and the description below. Other features, aspects, and advantages of the subject matter will become apparent from the description, the drawings, and the claims.

DETAILED DESCRIPTION

To make the objective, technical scheme and advantages of the disclosure clearer, the disclosure is further described below in detail in conjunction with the accompanying drawings.

In this specification, texts (or target texts) include but are not limited to: webpage text, user text (like electronic mail, message or attachment), promotion text (like advertisements) or any other electronic texts that can be classified into a hierarchical classification architecture considering traffic features, as those will be described in the following description.

And in this specification, content items include but not limited to: text content item (like any electronic texts), non-text text content items (like image content item, audio content item, video content item, and multimedia content item).

In the conventional art, without considering different feature attributes of different traffic, a webpage text, an advertising text or a user text cannot be classified effectively, therefore, only one dimension has a good effect and the effects of the other dimensions are common.

Whereas, in the embodiments of the disclosure, the traffic is also introduced to a hierarchical classification architecture and the name of the traffic is taken as a node for hierarchical classification. During text classification, it is possible to judge which traffic the page contents of the webpage text, the promotion text and the user text belong to at first and then to specifically classify the page contents according to the traffic, so that the hierarchical classification architecture is very easy to expand.

In the embodiments of the disclosure, in one aspect, a classification architecture is set up for different traffic and integrated into the whole hierarchical classification architecture; and in another aspect, the feature information of different traffic is fully utilized to provide a unified reliable method for the classification of the webpage text, the promotion text (such as an advertising text) and the user text, so as to ensure the overall effect of the classification.

Figure 1:
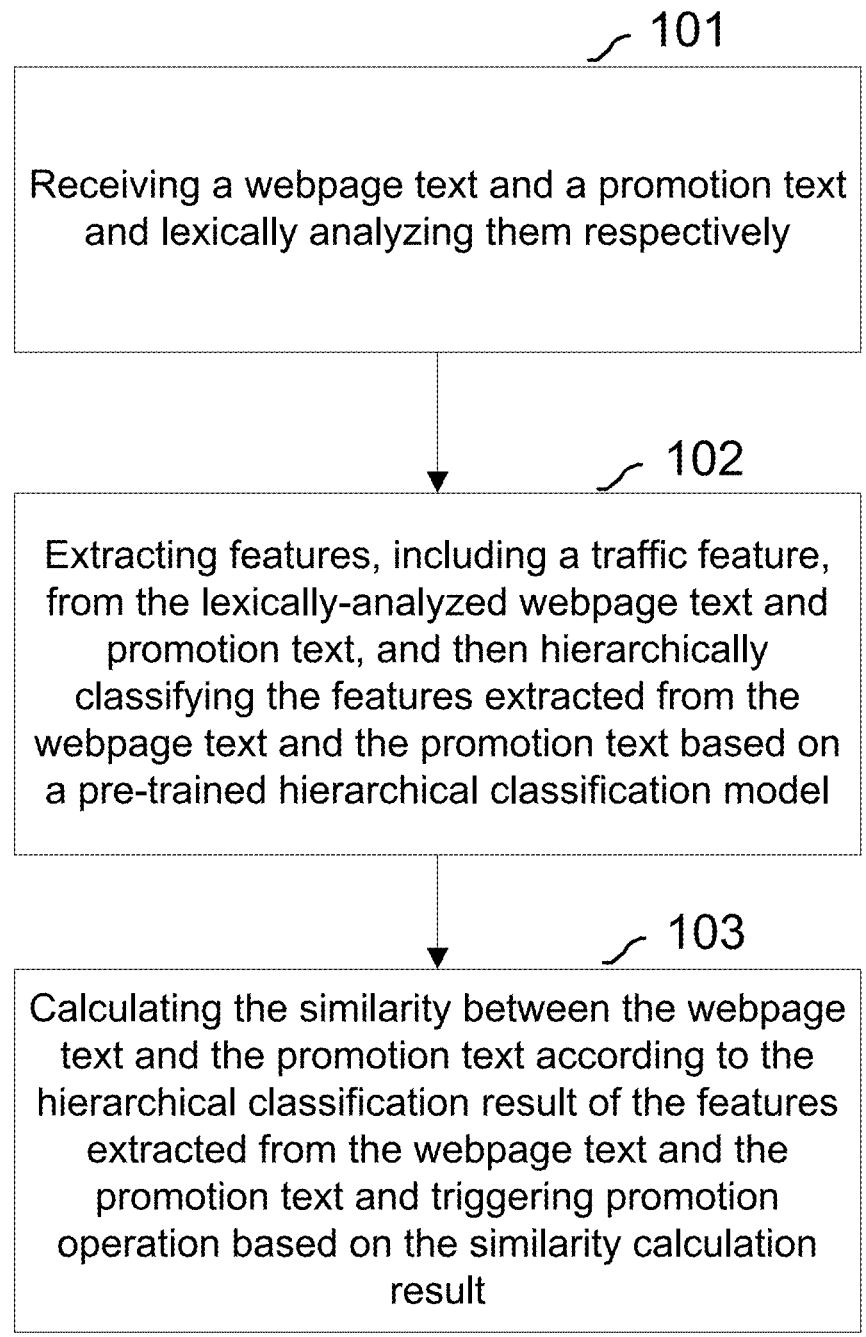
FIG. 1 is a flowchart of a promotion triggering method according to some embodiments.

FIG. 1 is a flowchart of a promotion triggering method based on text classification according to some embodiments.

As shown, the method includes:

Step 101: A webpage text and a promotion text are received and lexically analyzed respectively.

Here, the promotion text can be specifically provided by a promotion source (such as an advertiser) to promote a product or a service. For example, the promotion text can be an advertising text provided by an advertiser.

The webpage text and the promotion text are lexically analyzed respectively. The lexical analysis is a process to convert a character sequence into a word sequence in the computer science. The program or function for the lexical analysis is called a lexical analyzer (Lexer for short) or a scanner.

The lexical analyzer generally exists in the form of a function for the calling of a syntactic analyzer. In the lexical analysis stage, a source program is generally read in character by character from left to right, that is, the character stream forming the source program is scanned and then a word (also called a word symbol or a symbol) is identified according to a word formation rule. The lexical analysis program is configured to implement the task and can be generated automatically using Lex and other tools.

Step 102: Features, including a traffic feature, are extracted from the lexically-analyzed webpage text and promotion text, and then classified hierarchically based on a pre-trained hierarchical classification model.

Here, the features, including the traffic feature, are extracted from the lexically-analyzed webpage text and also from the lexically-analyzed promotion text.

The traffic feature of the webpage text is used for identifying the source feature of the webpage text, and the promotion text is used for identifying the source feature of the promotion text.

For example, the traffic feature of the webpage text can be identified by the Uniform Resource Locator (URL) or the website source of the webpage text.

In one embodiment, the URL of the webpage text can be parsed at first and then the traffic feature of the webpage text is determined according to the URL. For example, if it is determined that the webpage text is from a news website according to a preset keyword in its URL, it is possible to determine that the traffic feature of the webpage text is "news". If it is determined that the webpage text is from a finance and economic website according to a preset keyword in its URL, it is possible to determine that the traffic feature of the webpage text is "finance and economics". If it is determined that the webpage text is from a portal according to a preset keyword in its URL, it is possible to determine that the traffic feature of the webpage text is the portal.

The traffic feature of the promotion text can be identified by the promotion source category of the promotion text. The promotion sources can be classified for various industries according to the traffic feature. And they can be distinguished according to various classification ways when being classified for industries.

For example, they can be classified according to three industries. The first industry refers to the agricultural, forestry, husbandry and fishery industries; the second industry refers to the mining industry, manufacturing industry, electric power, fuel gas, and water production and supply industry and construction industry; and the third industry refers to other industries except for the first and second industries, specifically including: transportation, warehousing and postal industry, information transmission, computer service and software industry, wholesale and retail industry, accommodation and catering industry, financial industry, real estate industry, leasing and business service industry, scientific research, technical service and geological prospecting industry, water conservancy, environment and public facilities administration industry, resident services and other services industry, education, health, social security and social welfare industry, culture, sport and entertainment industry, public management and social organization, international organization and the like.

Optionally, they can be classified into fifteen categories according to the national economy industry, specifically as follows: (1) agricultural, forestry, husbandry and fishery industries; (2) extractive industry; (3) manufacturing industry; (4) electric power, fuel gas, and water production and supply industry; (5) construction industry; (6) geological prospecting and water conservancy industry; (7) transportation, warehousing and posts and telecommunications industry; (8) wholesale and retail trade and catering industry; (9) finance and insurance industry; (10) real estate industry; (11) social service industry; (12) health, sports and social welfare industry; (13) education, culture and art, broadcasting, film and television industry; (14) scientific research and integrated technological service industry; (15) state organ, political organ and social organization and the like.

What listed above are the embodiments of classification for industries; and those skilled in the art can recognize that what listed are only for description and not intended to limit the scope of protection of the embodiments of the disclosure.

In one embodiment, besides the traffic feature, such features as token, keyword, topic, general keyword, expanded keyword or named entity can also be extracted from the lexically analyzed webpage text and promotion text.

In one embodiment, a maximum entropy model can be trained for each classified text. For a target text to be classified, a real type feature, including both a feature item and a feature value, is preferably input to a classification trainer.

For example, the features and template of a classifier can be designed as follows; and the features in each category start with a number+"-":

A token feature: starting with "1-"+a token name, such as"1-iphone, 1-ipad";

a keyword feature: starting with "2-"+a keyword name, such as"2-iphone 4s, 2-ipad2";

a topic feature: starting with "3-"+a topic id, such as"3-1, 3-10";

a general keyword feature: starting with "4-"+a general keyword name, such as"4-flower";

a named entity feature: starting with "5-"+a named entity type, such as "5-BRAND"; and an expanded keyword feature: starting with "6-"+an expanded keyword name, such as"6-flower express";

For the features in each category, the feature value needs to be normalized to [0,1] and added with an on-off control to facilitate an offline experiment and the evaluation of contribution made by the features in each category to the classifier. After the features are extracted and verified completely, a feature selection method, which is based on a statistic method, can be considered to filter partial redundant features, such as using chi square information gain and the like.

Step 103: The similarity between the webpage text and the promotion text is calculated according to the hierarchical classification of the features extracted from the webpage text and the promotion text and promotion operation is triggered according to the similarity calculation result.

Here, the similarity between the webpage text and the promotion text is calculated according to the hierarchical classification of the features extracted from the webpage text and the promotion text and promotion operation is triggered according to the similarity calculation result. Specifically, the similarity between the webpage text and the promotion text can be calculated by several text similarity algorithms.

For example, in a vector space model, the text refers to various machine readable records. It is represented by a Document (D), the feature term (represented by t) refers to a basic linguistic unit capable of representing the document contents in the document D, and is mainly formed by a word or a phrase; and the text can be expressed as D (T1, T2, . . . , Tn) by a feature item set, where Tk is a feature item, and $1<=k<=N$. For example, a document can be expressed as D (a, b, c and d) if having four feature items: a, b, c and d. For a target text having n feature items, generally, certain weight may be given to each feature item to show its degree of importance. That is, D=D (T1, W1; T2, W2; . . . , Tn, Wn) is abbreviated to D=D (W1, W2, . . . , Wn), which is called the vector representation of the text D. where Wk is the weight of Tk, and $1<=k<=N$.

In this example, it is assumed that the weights of a, b, c and d are 30, 20, 20 and 10 respectively, the vectors of the text are expressed as D (30, 20, 20 and 10). In a vector space model, the content similarity Sim (D1, D2) between two texts D1 and D2 is generally represented by the cosine value of angle between vectors.

For a target text to be classified, a feature extraction module is shared for feature extraction during online prediction and offline training, so as to ensure the consistence of the online and offline features. Meanwhile, a hierarchical classifier predictor based on the maximum entropy model needs to be designed, by which classification is made as follows:

A well trained sub classification model is loaded to each node; the classification is made from the root node according to the first classification architecture at first, wherein due to the maximum entropy classifier, the output value of each category is a probability value, with a sum of 1; the child classification nodes of the lower layer are classified one by one, wherein whether to continue the classification will be controlled according to a threshold, and if the classification of the upper layer is less than the threshold, the classification is not continued; the classification value of the child nodes of each layer multiplies by that of the parent nodes, so as to ensure that the sum of the classification values of each layer is 1; after the whole hierarchical classifier is traversed completely, the classifications of each layer are sequenced in a descending order, and may be output according to the threshold or in a Top-N order when called actually.

After the similarity between the webpage text and each candidate promotion text is calculated completely, the primarily-selected promotion texts may be pulled out according to the sequence of the similarities and the final sequencing result is determined by a promotion click rate prediction system. In addition, a predetermined number of promotion texts on the top of the sequence are pushed to users on the webpage text.

The process further includes: a user text is received and lexically analyzed; features, including a traffic feature, are extracted from the lexically analyzed user text and then classified hierarchically based on a pre-trained hierarchical classification model; and the similarity between the webpage text and the user text is calculated according to the hierarchical classification of the features extracted from the webpage text and the user text.

Meanwhile, the process that the similarity between the webpage text and the promotion text is calculated according to the hierarchical classification of the features extracted from the webpage text and the promotion text and the promotion operation is triggered based on the calculation result of the similarity specifically includes: weighted summation is performed on the similarity between the webpage text and the user text and that between the webpage text and the promotion text and the promotion operation is triggered according to the weighted summation result.

Similarly, the traffic feature of the user text is used for identifying the source feature of the user text. Specifically, the user text may include a historical search query request item of the user, a microblog tag of the user or a webpage title browsed by the user, and the like.

Furthermore, the user can browse the webpage text and the promotion text through a browser on various terminals, which include but are not limited to: feature phone, smart phone, handheld computer, Personal Compute (PC), tablet PC or Personal Digital Assistant (PDA) and the like.

Although the embodiments of the terminals have been listed above in detail, those skilled in the art can recognize that what listed are only for description and not intended to limit the scope of protection of the embodiment of the disclosure. The browser can specifically include INTERNET EXPLORER of MICROSOFT, FIREFOX of MOZILLA, SAFARI of APPLE, OPERA, GOOGLE CHROME, GREENBROWSER and other browsers.

Although some common browsers have been listed in detail above, those skilled in the art can recognize that the embodiment of the disclosure is not limited to these browsers and can adapt to any application which can be used for displaying the documents in a webpage server or a file system and realizing interaction between a user and the file; and these applications can be various current common browsers or any other applications having a webpage browsing function.

In the embodiment of the disclosure, a set of text classifiers which can classify the promotion text (tile, keyword and other information), the user text (browsing history, searching history and other information) and the webpage text (webpage title, text contents and other information) is set up. The objective is to set up a hierarchical classification architecture for a scenario-based advertising architecture and establish a tagged corpus compatible with a webpage, User Generated Contents (UGCs) and an advertisement bank and a robust and reliable high-performance classifier according to the classification architecture.

In the embodiment of the disclosure, a unified hierarchical classification architecture is set up for the promotion text, the webpage text and user information. At first, because the promotion text, the user text and the webpage text need to be projected to the same classification architecture, a classification architecture needs to be set up to cover the commercial concepts in the promotion text, the user text and the webpage text. And because the commercial concepts have a natural hierarchical architecture, which allows the classifier to be classified to a smaller category in deficiency of information and classified to a larger category in sufficiency of information, a hierarchical classifier is needed; and traffic information is considered to be added to the classification architecture as a node in the hierarchical classification architecture.

Figure 2:
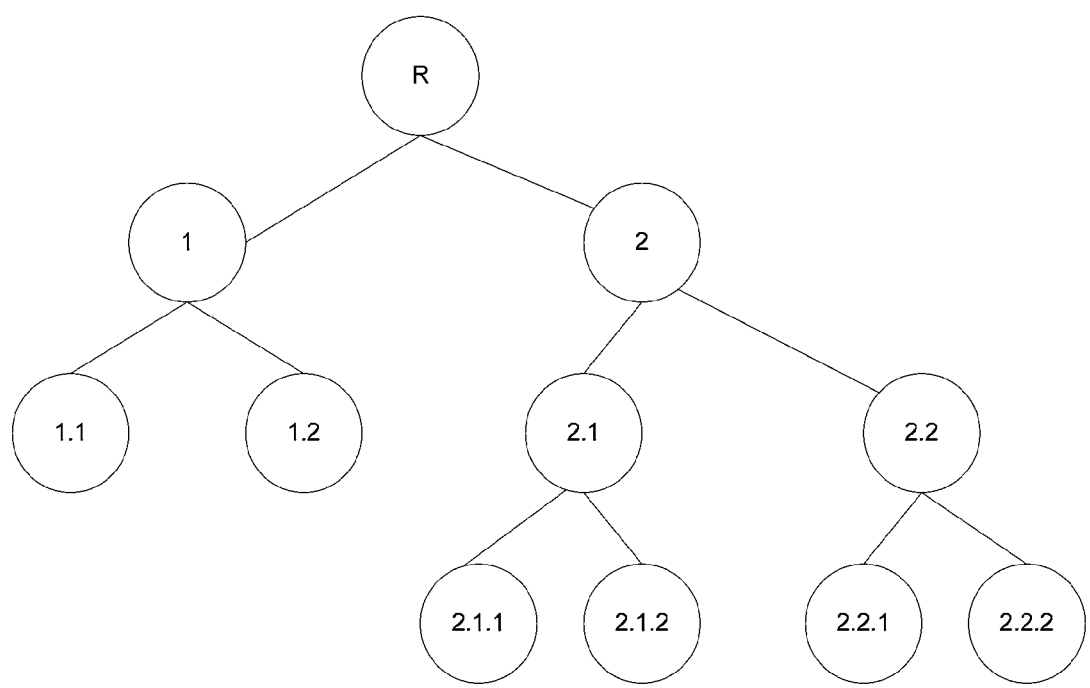
FIG. 2 is a diagram showing the structure of a classification architecture according to some embodiments.

FIG. 2 is a diagram showing the structure of a classification architecture according to some embodiments. As shown, in the embodiment of the disclosure, a unified hierarchical classification architecture for a promotion text, a webpage text and user information is set up.

Based on what analyzed above, one embodiment of the disclosure further provides a promotion triggering apparatus based on text classification.

Figure 3:
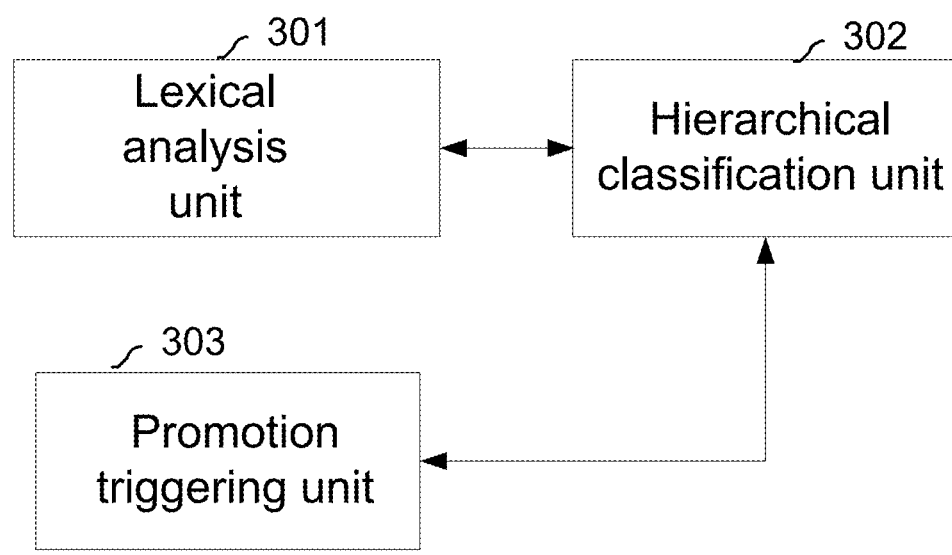
FIG. 3 is a diagram showing the structure of a promotion triggering apparatus based on text classification according to some embodiments.

FIG. 3 is a diagram showing the structure of a promotion triggering apparatus based on text classification according to some embodiments. As shown, the apparatus includes a lexical analysis unit 301, a hierarchical classification unit 302 and a promotion triggering unit 303, wherein the lexical analysis unit 301 is configured to receive a webpage text and a promotion text and lexically analyze them respectively;

the hierarchical classification unit 302 is configured to extract features, including a traffic feature, from the lexically-analyzed webpage text and promotion text, and hierarchically classify the extracted features based on a pre-trained hierarchical classification model; and the promotion triggering unit 303 is configured to calculate the similarity between the webpage text and the promotion text according to the hierarchical classification of the features extracted from the webpage text and the promotion text, and trigger promotion operation based on the similarity calculation result.

In one embodiment, the lexical analysis unit 301 is further configured to receive a user text, lexically analyze the user text, extract features, including a traffic feature, from the lexically analyzed user text, and hierarchically classify the features extracted from the user text based on a pre-trained hierarchical classification model;

the hierarchical classification unit 302 is further configured to calculate the similarity between the webpage text and the user text according to the hierarchical classification of the features extracted from the webpage text and the user text; and the promotion triggering unit 303 is further configured to perform weighted summation on the similarity between the webpage text and the user text and that between the webpage text and the promotion text and trigger promotion operation according to the weighted summation result.

In one embodiment, the hierarchical classification unit 302 is configured to parse the URL of the webpage text and determine the traffic feature of the webpage text according to the URL.

In one embodiment, the lexical analysis unit 301 is configured to receive a historical search query request item of the user, a microblog tag of the user or a webpage title browsed by the user.

In one embodiment, the hierarchical classification unit 302 is configured to extract such features as traffic, token, keyword, topic, general keyword, expanded keyword or named entity from the lexically analyzed webpage text and promotion text respectively.

Figure 4:
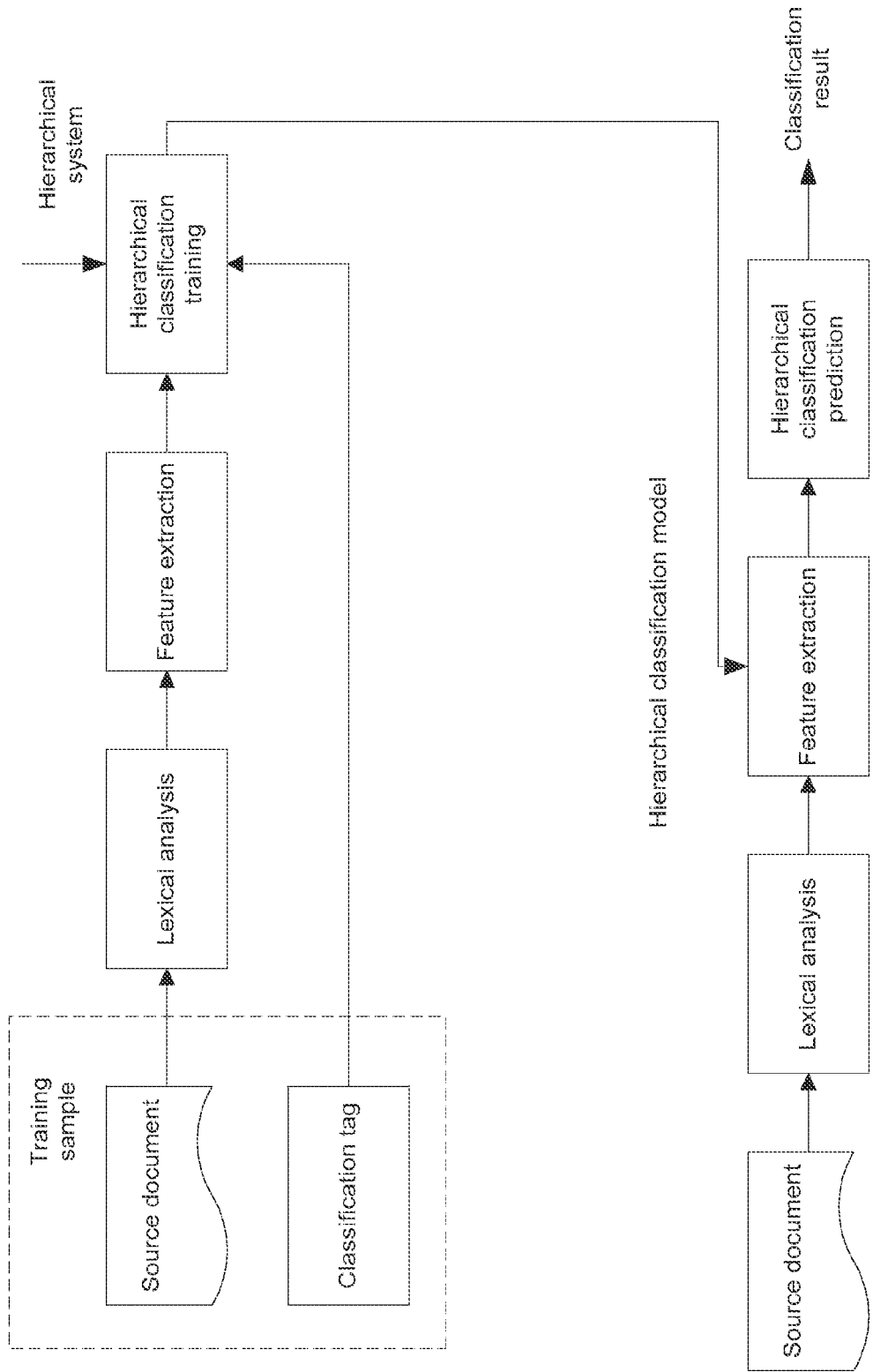
FIG. 4 is a diagram showing a promotion triggering method based on text classification according to other embodiments.

FIG. 4 is a diagram showing a promotion triggering method based on text classification according to other embodiments.

As shown, a source document in a training sample (including a preset classification tag and source document) can be lexically analyzed to extract the features of the source document; and hierarchical classification training is further performed based on a preset hierarchical architecture and classification tag to obtain a hierarchical classification model. Then, the features extracted from the classified texts (including a webpage text, a promotion text or a user text) are classified hierarchically by the hierarchical classification model. Finally, the similarity between the webpage text and the promotion text can be calculated according to the hierarchical classification result of the features extracted from the webpage text and the promotion text and promotion operation is triggered according to the similarity calculation result.

Actually, the promotion triggering method and apparatus based on the text classification provided by the embodiments of the disclosure can be specifically implemented in various forms.

For example, the promotion triggering method based on the text classification can be written as a plug-in program installed to a personal computer, a mobile terminal and the like or encapsulated as an application for a user to download and use by following a specified application interface. When written as the plug-in program, the method can be implemented in various plug-in forms, such as ocx, dll and cab. The promotion triggering method based on the text classification provided by the embodiment of the disclosure can also be implemented by a Flash plug-in, a RealPlayer plug-in, an Multimedia Messaging Service (MMS) plug-in, an Musical Instrument Digital Interface (MIDI) stave plug-in, an ActiveX plug-in and other specific technologies.

The promotion triggering method based on the text classification provided by the embodiment of the disclosure can be stored to various storage media in a storage way of an instruction or an instruction set. These storage media include but are not limited to: floppy disk, optical disk, Digital Versatile Disc (DVD), hard disk, flash memory, Universal Serial Bus (USB) flash disk, Compact Flash (CF) card, Secure Digital (SD) memory card, MultiMedia Card (MMC) card, Smart Media (SM) card, memory stick, Extreme Digital (xD) card and the like.

In addition, the promotion triggering method based on the text classification provided by the embodiment of the disclosure can be further applied to a storage medium based on an NAND flash, such as a USB flash disk, a CF card, an SD card, an High Capacity SD (SDHC) card, an MMC card, an SM card, a memory stick, an xD card and the like.

To sum up, in the embodiments of the disclosure, the webpage text and the promotion text are received and lexically analyzed respectively; the features, including the traffic feature, are extracted from the lexically-analyzed webpage text and promotion text, and then classified hierarchically based on a pre-trained hierarchical classification model; and the similarity between the webpage text and the promotion text is calculated according to the hierarchical classification result of the features extracted from the webpage text and the promotion text and promotion operation is triggered according to the similarity calculation result. Thus, after the application of the embodiments of the disclosure, the webpage text, the promotion text or the user text can be effectively classified in consideration of different feature attributes of different traffic. Different traffic focuses on different feature information, so, the classification accuracy and the promotion accuracy can be improved effectively.

Figure 5:
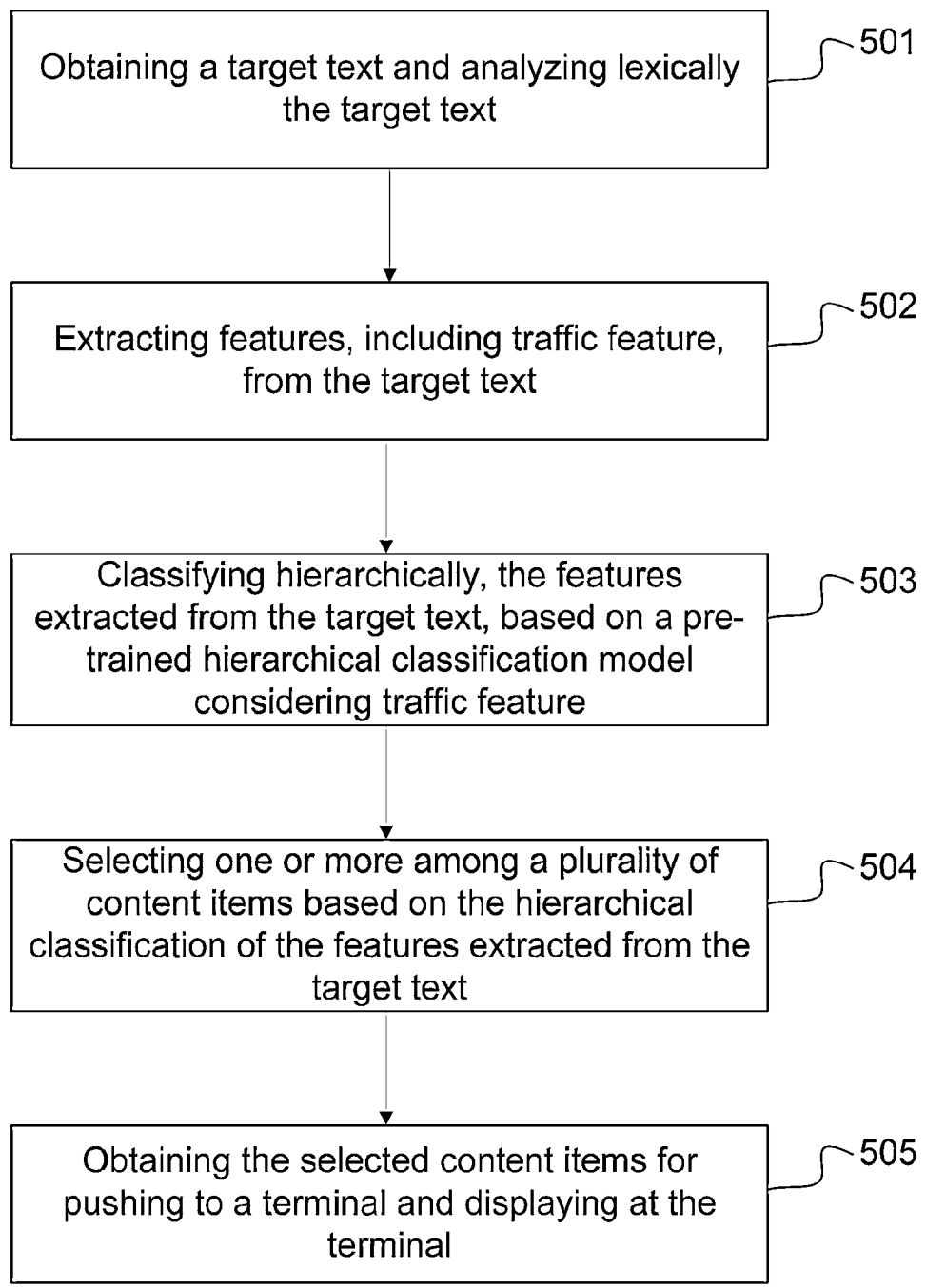
FIG. 5 is a flowchart of a content items pushing method according to some embodiments.

Referring to FIG. 5, which is a flowchart of a content items pushing method according to some embodiments.

In step 501, a target text maybe obtained and analyzed lexically.

The text may be at least one of webpage text, user text and promotion text.

The webpage text may be one that can be extracted a traffic feature identifying source of the webpage text. In an example, the source may be Uniform Resource Locator (URL) or website source of the webpage text, The user text may be one that can be extracted a traffic feature identifying source of the user text.

The promotion text may be one that can be extracted a traffic feature identifying source of the promotion text. In an example, the source may be industry category of the promotion text. In an example, the promotion text may be provided by a promotion source, such as an advertiser, to promote a product or a service. For example, the promotion text may be an advertising text provided by an advertiser.

In general, lexical analysis is a process to convert a character sequence into a word sequence in computer science. The program or function for lexical analysis is called a lexical analyzer (Lexer for short) or a scanner.

A lexical analyzer generally exists in the form of a function for the calling of a syntactic analyzer. In lexical analysis stage, a source program is generally read in character by character from left to right, that is, the character stream forming the source program is scanned and then a word (also called a word symbol or a symbol) is identified according to a word formation rule. The lexical analysis program is configured to implement the task and can be generated automatically using Lex and other tools.

In step 502, features, including traffic feature, may be extracted from the lexically-analyzed text.

The traffic feature of a target text may be used for identifying the source feature of the text.

In an example, traffic feature of a webpage text may be identified by Uniform Resource Locator (URL) or website source of the webpage text.

In an example, the URL of the webpage text may be parsed at first and then traffic feature of the webpage text may be determined according to the URL. For example, if it is determined that the webpage text is from a news website according to a preset keyword in its URL, it may be determined that the traffic feature of the webpage text is "news". If it is determined that the webpage text is from a finance and economic website according to a preset keyword in its URL, it may be determined that the traffic feature of the webpage text is "finance and economics". If it is determined that the webpage text is from a portal according to a preset keyword in its URL, it may be determined that the traffic feature of the webpage text is the portal.

In an example, traffic feature of a promotion text may be identified by the promotion source category of the promotion text. The promotion sources may be classified into various industry categories according to the traffic feature. And they may be distinguished according to various classification ways when being classified for industries.

For example, they may be classified into three industries. The first industry may refer to agricultural, forestry, husbandry and fishery industries. The second industry may refer to mining industry, manufacturing industry, electric power, fuel gas, and water production and supply industry and construction industry. The third industry may refer to other industries except for the first and second industries, specifically including: transportation, warehousing and postal industry, information transmission, computer service and software industry, wholesale and retail industry, accommodation and catering industry, financial industry, real estate industry, leasing and business service industry, scientific research, technical service and geological prospecting industry, water conservancy, environment and public facilities administration industry, resident services and other services industry, education, health, social security and social welfare industry, culture, sport and entertainment industry, public management and social organization, international organization and the like.

Optionally, they can be classified into fifteen categories according to the national economy industry, specifically as follows: (1) agricultural, forestry, husbandry and fishery industries; (2) extractive industry; (3) manufacturing industry; (4) electric power, fuel gas, and water production and supply industry; (5) construction industry; (6) geological prospecting and water conservancy industry; (7) transportation, warehousing and posts and telecommunications industry; (8) wholesale and retail trade and catering industry; (9) finance and insurance industry; (10) real estate industry; (11) social service industry; (12) health, sports and social welfare industry; (13) education, culture and art, broadcasting, film and television industry; (14) scientific research and integrated technological service industry; (15) state organ, political organ and social organization and the like.

What listed above are the embodiments of classification for industries; and those skilled in the art can recognize that what listed are only for description and not intended to limit the scope of protection of the embodiments of the disclosure.

In an example, besides the traffic feature, such features as token, keyword, topic, general keyword, expanded keyword or named entity may also be extracted from the lexically analyzed webpage text and promotion text.

In step 503, based on a pre-trained hierarchical classification model considering traffic feature, the features extracted from the text may be classified hierarchically.

In an example, a maximum entropy model may be trained for each classified text. For a target text to be classified, a real type feature, including both a feature item and a feature value, is preferably input to a classification trainer.

For example, the features and template of a classifier can be designed as follows; and the features in each category start with a number+"-":

A token feature: starting with "1-"+a token name, such as"1-iphone, 1-ipad";

a keyword feature: starting with "2-"+a keyword name, such as"2-iphone 4s, 2-ipad2";

a topic feature: starting with "3-"+a topic id, such as"3-1, 3-10";

a general keyword feature: starting with "4-"+a general keyword name, such as"4-flower";

a named entity feature: starting with "5-"+a named entity type, such as "5-BRAND"; and an expanded keyword feature: starting with "6-"+an expanded keyword name, such as"6-flower express";

For the features in each category, the feature value needs to be normalized to [0,1] and added with an on-off control to facilitate an offline experiment and the evaluation of contribution made by the features in each category to the classifier. After the features are extracted and verified completely, a feature selection method, which is based on a statistic method, may be considered to filter partial redundant features, such as using chi square, information gain and the like.

In step 504, based on the hierarchical classification of the features extracted from the text, one or more may be selected among a plurality of content items.

The promotion content item to be selected may be a piece of text, a locator such as a URL, a map, an image, an animation, a piece of audio or a video clip that can be played back, a message, or any combination thereof.

The promotion content item may be a promotion text which can be extracted a traffic feature identifying source of the promotion text. In an example, the source may be industry category of the promotion text. In an example, the promotion text may be provided by a promotion source, such as an advertiser, to promote a product or a service. For example, the promotion text may be an advertising text provided by an advertiser.

In step 505, the selected content items are obtained for pushing to a terminal and displayed at the terminal.

A user may browse the promotion text through a browser on the terminal, which include but are not limited to: feature phone, smart phone, handheld computer, Personal Computer (PC), tablet PC or Personal Digital Assistant (PDA) and the like.

The browser can specifically include INTERNET EXPLORER of MICROSOFT, FIREFOX of MOZILLA, SAFARI of APPLE, OPERA, GOOGLE CHROME, GREEN BROWSER and other browsers.

Figure 6:
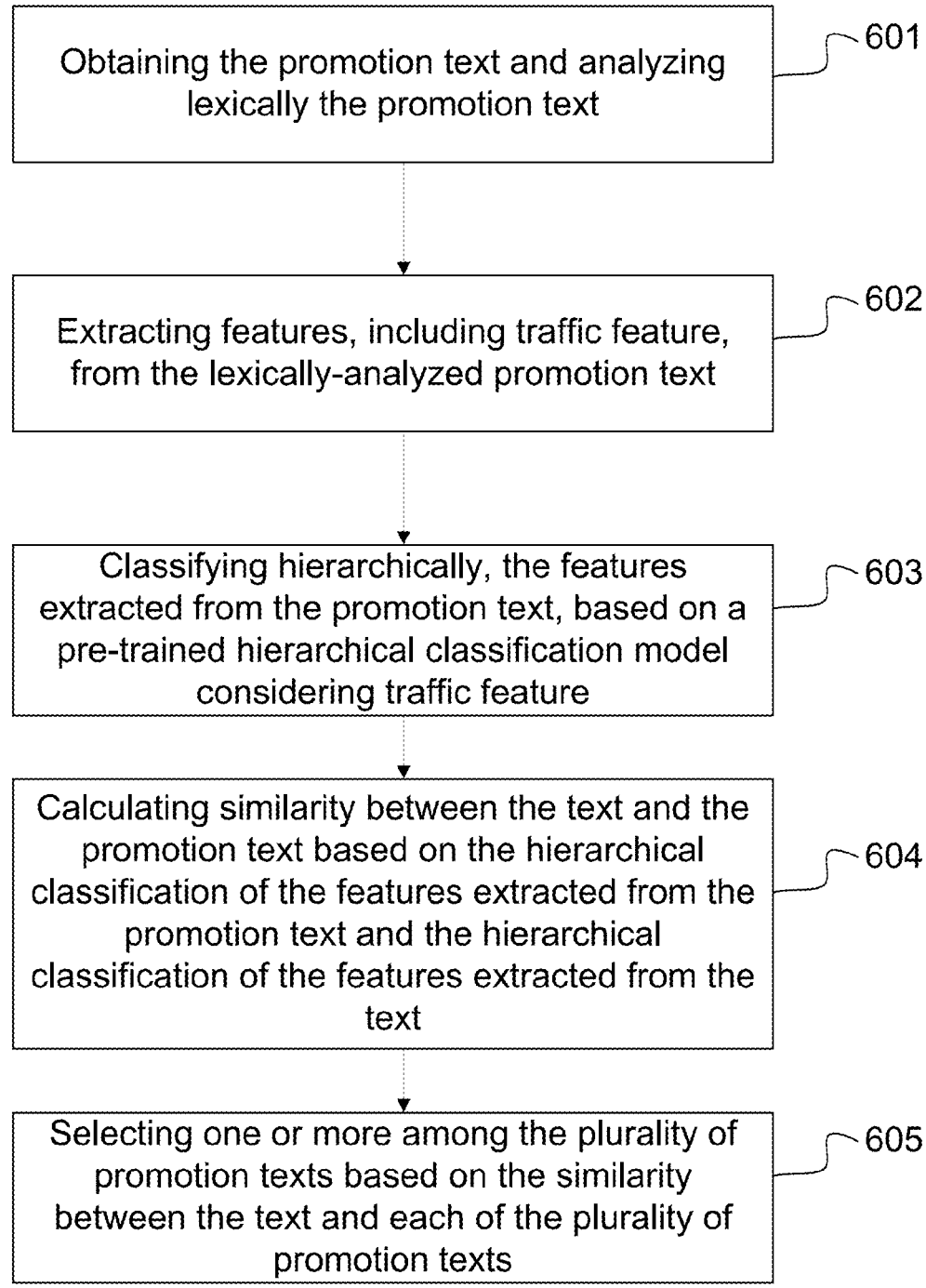
FIG. 6 is a flowchart of selecting one or more from a plurality of promotion texts according to some embodiments.

Referring to FIG. 6, which is a flowchart of selecting one or more from a plurality of promotion texts according to some embodiments. In an example, the selection method shown in FIG. 1 may be applied in step 504 shown in FIG. 5 for selecting one or more among a plurality of promotion texts.

For each promotion text to be selected among the plurality of promotion texts, the following steps 601-604 are performed. Based on the similarity between the text in the method shown in FIG. 5 and each of the plurality of promotion texts, one or more among the plurality of promotion texts may be selected for pushing to a terminal and displayed at the terminal.

In step 601, the promotion text may be obtained and analyzed lexically.

The promotion text may be one that can be extracted a traffic feature identifying source of the promotion text. In an example, the source may be industry category of the promotion text. In an example, the promotion text may be provided by a promotion source, such as an advertiser, to promote a product or a service. For example, the promotion text may be an advertising text provided by an advertiser.

A lexical analysis is a process to convert a character sequence into a word sequence in the computer science. Program or function for the lexical analysis is called a lexical analyzer (Lexer for short) or a scanner.

Generally, a lexical analyzer exists in the form of a function for the calling of a syntactic analyzer. In lexical analysis stage, a source program is generally read in character by character from left to right, that is, the character stream forming the source program is scanned and then a word (also called a word symbol or a symbol) is identified according to a word formation rule. The lexical analysis program is configured to implement the task and can be generated automatically using Lex and other tools.

In step 602, features including traffic feature may be extracted from the lexically-analyzed promotion text.

In an example, traffic feature of a promotion text may be identified by the promotion source category of the promotion text. The promotion sources may be classified into various industry categories according to the traffic feature. And they may be distinguished according to various classification ways when being classified for industries.

For example, they may be classified into three industries. The first industry may refer to agricultural, forestry, husbandry and fishery industries. The second industry may refer to mining industry, manufacturing industry, electric power, fuel gas, and water production and supply industry and construction industry. The third industry may refer to other industries except for the first and second industries, specifically including: transportation, warehousing and postal industry, information transmission, computer service and software industry, wholesale and retail industry, accommodation and catering industry, financial industry, real estate industry, leasing and business service industry, scientific research, technical service and geological prospecting industry, water conservancy, environment and public facilities administration industry, resident services and other services industry, education, health, social security and social welfare industry, culture, sport and entertainment industry, public management and social organization, international organization and the like.

Optionally, they can be classified into fifteen categories according to the national economy industry, specifically as follows: (1) agricultural, forestry, husbandry and fishery industries; (2) extractive industry; (3) manufacturing industry; (4) electric power, fuel gas, and water production and supply industry; (5) construction industry; (6) geological prospecting and water conservancy industry; (7) transportation, warehousing and posts and telecommunications industry; (8) wholesale and retail trade and catering industry; (9) finance and insurance industry; (10) real estate industry; (11) social service industry; (12) health, sports and social welfare industry; (13) education, culture and art, broadcasting, film and television industry; (14) scientific research and integrated technological service industry; (15) state organ, political organ and social organization and the like.

What listed above are the embodiments of classification for industries; and those skilled in the art can recognize that what listed are only for description and not intended to limit the scope of protection of the embodiments of the disclosure.

In an example, besides the traffic feature, such features as token, keyword, topic, general keyword, expanded keyword or named entity may also be extracted from the lexically analyzed webpage text and promotion text.

In step 603, based on a pre-trained hierarchical classification model considering traffic feature, the features extracted from the promotion text may be classified hierarchically.

In an example, a maximum entropy model may be trained for each classified text. For a target text to be classified, a real type feature, including both a feature item and a feature value, is preferably input to a classification trainer.

For example, the features and template of a classifier can be designed as follows; and the features in each category start with a number+"-":

A token feature: starting with "1-"+a token name, such as "1-iphone, 1-ipad";

a keyword feature: starting with "2-"+a keyword name, such as "2-iphone 4s, 2-ipad2";

a topic feature: starting with "3-"+a topic id, such as "3-1, 3-10";

a general keyword feature: starting with "4-"+a general keyword name, such as "4-flower";

a named entity feature: starting with "5-"+a named entity type, such as "5-BRAND"; and an expanded keyword feature: starting with "6-"+an expanded keyword name, such as "6-flower express";

For the features in each category, the feature value needs to be normalized to [0,1] and added with an on-off control to facilitate an offline experiment and the evaluation of contribution made by the features in each category to the classifier. After the features are extracted and verified completely, a feature selection method, which is based on a statistic method, may be considered to filter partial redundant features, such as using chi square, information gain and the like.

In step 604, based on the hierarchical classification of the features extracted from the promotion text and the hierarchical classification of the features extracted from the text, similarity between the text and the promotion text may be calculated.

In an example, the similarity between the webpage text and the promotion text is calculated according to the hierarchical classification of the features extracted from the webpage text and the promotion text and promotion operation is triggered according to the similarity calculation result. In an example, the similarity between the webpage text and the promotion text can be calculated by several text similarity algorithms.

For example, in a vector space model, the text refers to various machine readable records. It is represented by a Document (D), the feature term (represented by t) refers to a basic linguistic unit capable of representing the document contents in the document D, and is mainly formed by a word or a phrase; and the text can be expressed as D (T1, T2, . . . , Tn) by a feature item set, where Tk is a feature item, and $1<=k<=N$. For example, a document can be expressed as D (a, b, c and d) if having four feature items: a, b, c and d. For a target text having n feature items, generally, certain weight may be given to each feature item to show its degree of importance. That is, D=D (T1, W1; T2, W2; . . . , Tn, Wn) is abbreviated to D=D (W1, W2, . . . , Wn), which is called the vector representation of the text D. where Wk is the weight of Tk, and $1<=k<=N$.

In an example, it is assumed that the weights of a, b, c and d are 30, 20, 20 and 10 respectively, the vectors of the text are expressed as D (30, 20, 20 and 10). In a vector space model, the content similarity Sim (D1, D2) between two texts D1 and D2 is generally represented by the cosine value of angle between vectors.

For a target text to be classified, a feature extraction module is shared for feature extraction during online prediction and offline training, so as to ensure the consistence of the online and offline features. Meanwhile, a hierarchical classifier predictor based on the maximum entropy model needs to be designed, by which classification is made as follows:

A well trained sub classification model is loaded to each node; the classification is made from the root node according to the first classification architecture at first, wherein due to the maximum entropy classifier, the output value of each category is a probability value, with a sum of 1; the child classification nodes of the lower layer are classified one by one, wherein whether to continue the classification will be controlled according to a threshold, and if the classification of the upper layer is less than the threshold, the classification is not continued; the classification value of the child nodes of each layer multiplies by that of the parent nodes, so as to ensure that the sum of the classification values of each layer is 1; after the whole hierarchical classifier is traversed completely, the classifications of each layer are sequenced in a descending order, and may be output according to the threshold or in a topn order when called actually.

After the similarity between the webpage text and each candidate promotion text is calculated completely, the primarily-selected promotion texts may be pulled out according to the sequence of the similarities and the final sequencing result is determined by a promotion click rate prediction architecture. In addition, a predetermined number of promotion texts on the top of the sequence are pushed to users on the webpage text.

Figure 7:
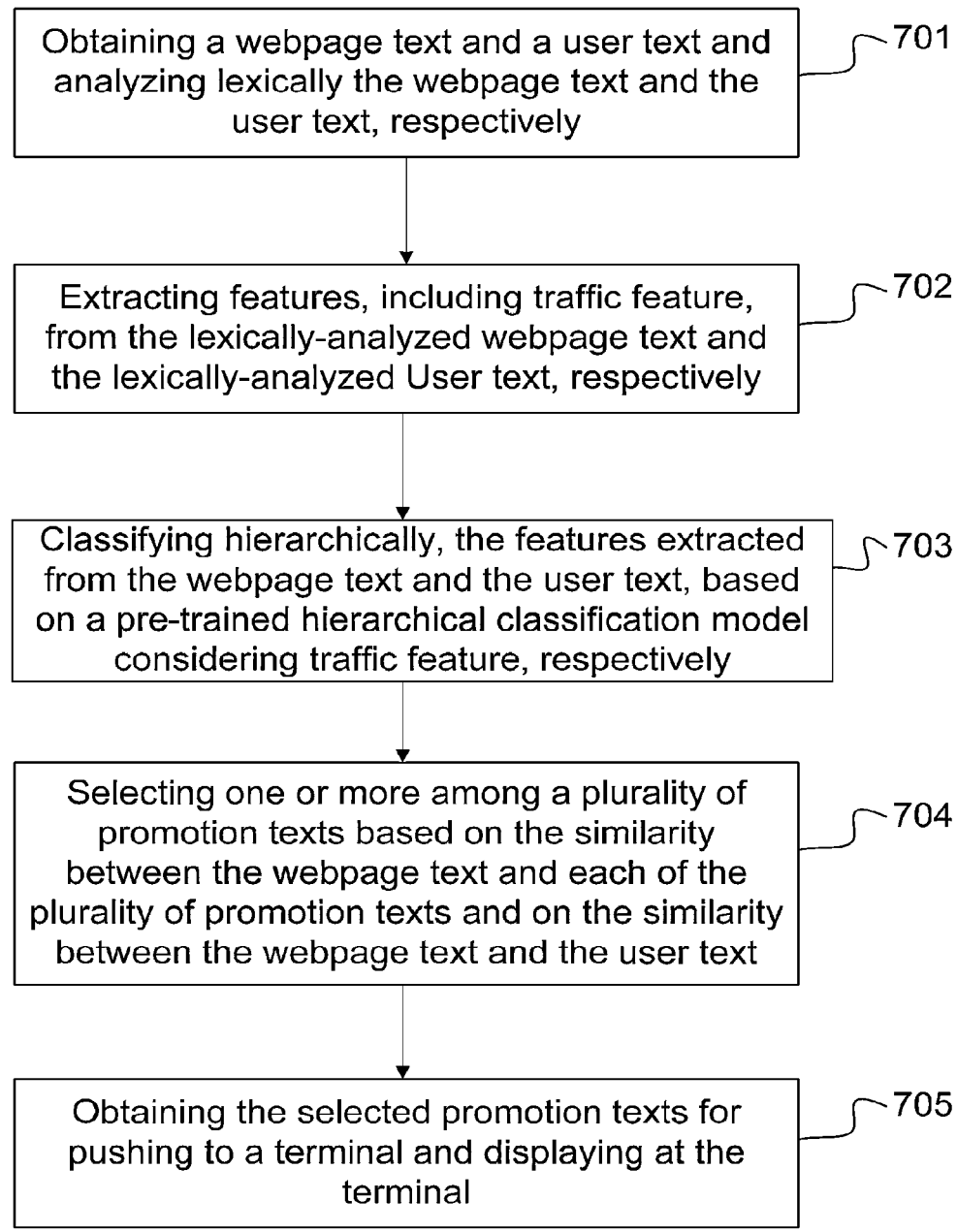
FIG. 7 is a flowchart of pushing promotion texts according to some embodiments.

Referring to FIG. 7, which is a flowchart of pushing promotion texts according to some other embodiments.

In step 701, a webpage text and a user text are obtained and analyzed lexically, respectively.

In step 702, features including traffic feature are extracted from the lexically-analyzed webpage text and the lexically-analyzed user text, respectively.

In step 703, based on a pre-trained hierarchical classification model considering traffic feature, the features extracted from the webpage text and the user text are classified hierarchically, respectively, In step 704, one or more are selected among a plurality of promotion texts based on the similarity between the webpage text and each of the plurality of promotion texts and on the similarity between the webpage text and the user text.

In an example, the process that the similarity between the webpage text and the promotion text is calculated according to the hierarchical classification result of the features extracted from the webpage text and the promotion text and the promotion operation is triggered based on the calculation result of the similarity specifically includes: weighted summation is performed on the similarity between the webpage text and the user text and that between the webpage text and the promotion text and the promotion operation is triggered according to the weighted summation result.

In an example, the traffic feature of the user text can be used for identifying the source feature of the user text. In an example, the user text may include a historical search query request item of the user, a microblog tag of the user or a webpage title browsed by the user, and the like.

In step 705, the selected promotion texts are obtained for pushing to a terminal and displaying at the terminal.

Figure 8:
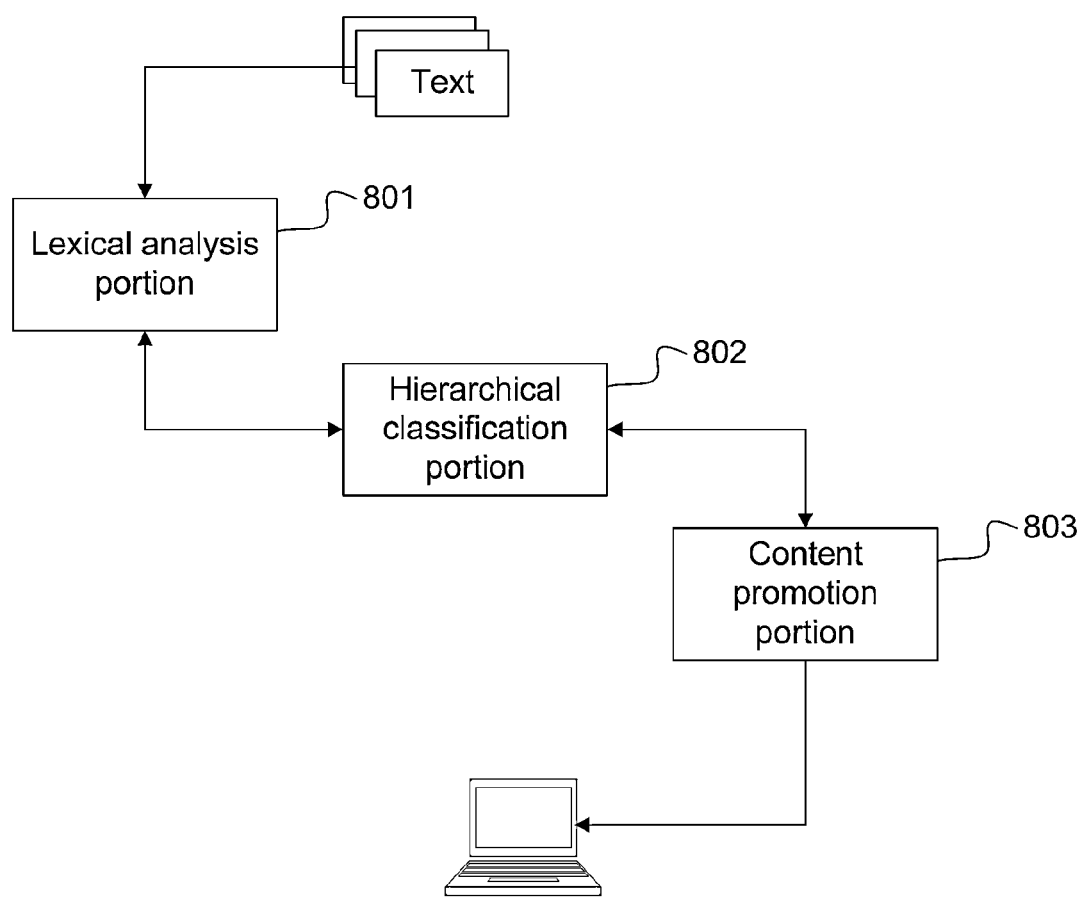
FIG. 8 is a block diagram illustrating a system according to some embodiments.

FIG. 8 is a block diagram illustrating a system according to some embodiments. The system may adopt the methods illustrated in FIGS. 5-7. For example, the system may include a lexical analysis portion 801, a hierarchical classification portion 802 and a content promotion portion 803.

The lexical analysis portion 801 can be configured to obtain a target text and analyze lexically the text.

The hierarchical classification portion 802 can be configured to extract features, including traffic feature, from the lexically-analyzed text and classify hierarchically the features extracted from the text based on a pre-trained hierarchical classification model considering traffic feature.

The content promotion portion 803 can be configured to select one or more among a plurality of content items based on the hierarchical classification of the features extracted from the text, obtain the selected content items and push the obtained content items to a terminal and displayed at the terminal.

The hierarchical classification portion 802 may be further configured to extract from the lexically-analyzed text features including traffic feature and at least one of the following: token, keyword, topic, general keyword, expanded keyword, named entity of the lexically-analyzed text.

The lexical analysis portion 803 may be further configured to obtain at least one of the following: webpage text which can be extracted a traffic feature identifying source, in particular Uniform Resource Locator (URL) or website source, of the webpage text; user text which can be extracted a traffic feature identifying source of the user text; promotion text which can be extracted a traffic feature identifying source, in particular industry, of the promotion text.

The content promotion portion 803 may be further configured to select one or more among a plurality of promotion texts.

The lexical analysis portion 801 may be further configured to obtain each of the plurality of promotion texts, and analyze lexically the promotion text. The hierarchical classification portion 802 may be further configured to: for each of the plurality of promotion texts, extract features including traffic feature from the lexically-analyzed promotion text and classify hierarchically the features extracted from the promotion text based on a pre-trained hierarchical classification model considering traffic feature. The content promotion portion 803 may be further configured to: for each of the plurality of promotion texts, calculate similarity between the text and the promotion text based on the hierarchical classification of the features extracted from the promotion text and the hierarchical classification of the features extracted from the text. The content promotion portion 803 may be further configured to select one or more among the plurality of promotion texts based on the similarity between the text and each of the plurality of promotion texts.

The lexical analysis portion 801 may be further configured to obtain a webpage text and a user text and analyze lexically the webpage text and the user text. The hierarchical classification portion 801 may be further configured to: extract features, including traffic feature, from the lexically-analyzed webpage text and classify hierarchically the features extracted from the webpage text based on a pre-trained hierarchical classification model considering traffic feature; and extract features, including traffic feature, from the lexically-analyzed user text and classify hierarchically the features extracted from the user text based on a pre-trained hierarchical classification model considering traffic feature. The content promotion portion 803 may be further configured to select one or more among the plurality of promotion texts based on the similarity between the webpage text and each of the plurality of promotion texts and on the similarity between the webpage text and the user text.

The lexical analysis portion 801 may be further configured to obtain a web-page text. The hierarchical classification portion may be further configured to parse Uniform Resource Locator (URL) of the webpage text; and determine the traffic feature of the webpage text based on the URL.

The lexical analysis portion 801 may be further configured to obtain a user text associated with a user identity and including at least one of the following: a historical search query request item associated with the user identity, a microblog tag associated with the user identity, a webpage title browsed associated with the user identity.

Figure 9:
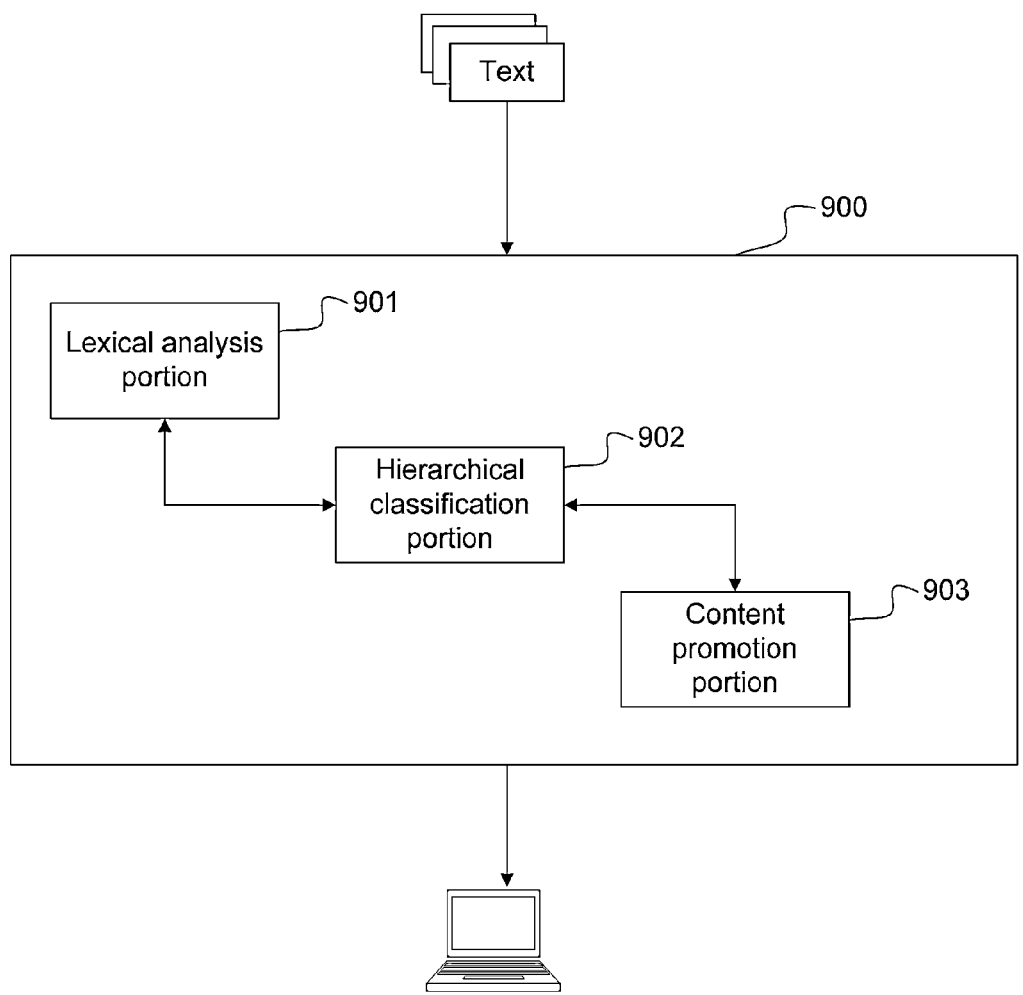
FIG. 9 is a block diagram illustrating a server according to some embodiments.

FIG. 9 is a block diagram illustrating a server according to some embodiments.

The server may include the system illustrated in FIG. 8, and adopt the methods illustrated in FIG. 5-7. Server 900 can include a lexical analysis portion 901, a hierarchical classification portion 902, and a content promotion portion 903.

The lexical analysis portion 901 can be configured to obtain a target text and analyze lexically the text.

The hierarchical classification portion 902 can be configured to extract features, including traffic feature, from the lexically-analyzed text and classify hierarchically the features extracted from the text based on a pre-trained hierarchical classification model considering traffic feature.

The content promotion portion 903 can be configured to select one or more among a plurality of content items based on the hierarchical classification of the features extracted from the text, to obtain the selected content items and to send the obtained content items to a terminal.

The lexical analysis portion 901 may be further configured to extract from the lexically-analyzed text features including traffic feature and at least one of the following: token, keyword, topic, general keyword, expanded keyword, named entity of the lexically-analyzed text.

The lexical analysis portion 901 may be further configured to obtain at least one of the following: webpage text which can be extracted a traffic feature identifying source, in particular Uniform Resource Locator (URL) or website source, of the webpage text, user text which can be extracted a traffic feature identifying source of the user text, promotion text which can be extracted a traffic feature identifying source, in particular industry, of the promotion text.

The content promotion portion 903 may be further configured to select one or more among a plurality of promotion texts.

The lexical analysis portion 901 may be further configured to: for each of the plurality of promotion texts, obtain the promotion text and analyze lexically the promotion text, The hierarchical classification portion 902 may be further configured to: for each of the plurality of promotion texts, extract features including traffic feature from the lexically-analyzed promotion text and classify hierarchically the features extracted from the promotion text based on a pre-trained hierarchical classification model considering traffic feature. The content promotion portion 903 may, for each of the plurality of promotion texts, calculate similarity between the text and the promotion text based on the hierarchical classification of the features extracted from the promotion text and the hierarchical classification of the features extracted from the text and select one or more among the plurality of promotion texts based on the similarity between the text and each of the plurality of promotion texts. The lexical analysis portion 901 may obtain a webpage text and a user text and analyze lexically the webpage text and the user text.

The hierarchical classification portion 902 may extract features, including traffic feature, from the lexically-analyzed webpage text and classify hierarchically the features extracted from the webpage text based on a pre-trained hierarchical classification model considering traffic feature; and extract features, including traffic feature, from the lexically-analyzed user text and classify hierarchically the features extracted from the user text based on a pre-trained hierarchical classification model considering traffic feature. The content promotion portion 903 may be further configured to select one or more among the plurality of promotion texts based on the similarity between the webpage text and each of the plurality of promotion texts and on the similarity between the webpage text and the user text.

The lexical analysis portion 901 may be further configured to obtain a web-page text. The hierarchical classification portion 902 may be further configured to parse Uniform Resource Locator (URL) of the webpage text; and determine the traffic feature of the webpage text based on the URL.

The lexical analysis portion 901 may be further configured to obtain a user text associated with a user identity and including at least one of the following: a historical search query request item associated with the user identity, a microblog tag associated with the user identity, a webpage title browsed associated with the user identity.

Figure 10:
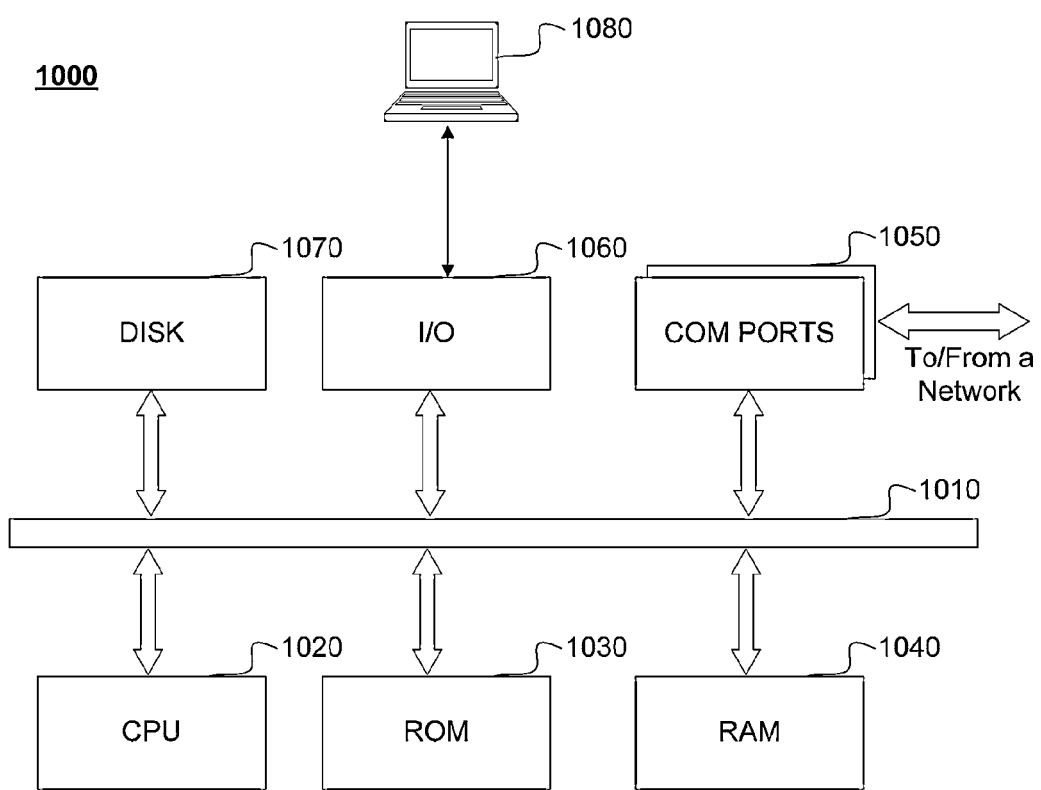
FIG. 10 depicts a general computer architecture on which the present teaching can be implemented.

FIG. 10 provides a functional block diagram illustration of a computer hardware platform which includes user interface elements. The computer hardware platform may be a general purpose computer or a special purpose computer, or even a server. This computer 1000, which shown in FIG. 10 as a specific example of the computer hardware platform, can be used to implement any components of the content items pushing and distribution architecture as described herein. For example, the lexical analysis portion for obtaining and analyzing a target text, a hierarchical classification portion for extracting features including traffic feature and classifying, and the content promotion portion for selecting one or more among a plurality of content items, can all be implemented on a computer such as computer 1000, via its hardware, software program, firmware, or a combination thereof. Although only one such computer is shown, for convenience, the computer functions relating to personalized template generation may be implemented in a distributed fashion on a number of similar platforms, to distribute the processing load.

The computer 1000, for example, includes Communication (COM) ports 1050 connected to and from a network connected thereto to facilitate data communications. The computer 1000 also includes a Central Processing Unit (CPU) 1020, in the form of one or more processors, for executing program instructions. The exemplary computer platform includes an internal communication bus 1010, program storage and data storage of different forms, e.g., disk 1070, Read Only Memory (ROM) 1030, or Random Access Memory (RAM) 1040, for various data files to be processed and/or communicated by the computer, as well as possibly program instructions to be executed by the CPU. The computer 1000 also includes an Input/Output (I/O) component 1060, supporting input/output flows between the computer and other components therein such as user interface elements 1080. The computer 1000 may also receive programming and data via network communications.

Hence, aspects of the methods of pushing and distributing content items may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the lexical analysis portion or other hierarchical classification portion into the hardware platform(s) of a computing environment or other system implementing a computing environment or similar functionalities in connection with pushing and distributing content items based on traffic feature. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a Compact Disc Read-Only Memory (CD-ROM), Digital Versatile Disc (DVD) or Digital Versatile Disc Read-Only Memory (DVD-ROM), any other optical medium, punch cards paper tape, any other physical storage medium with patterns of holes, a Random Access Memory (RAM), a (Programmable Read-Only Memory (PROM) and Erasable Programmable Read-Only Memory (EPROM), a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

All references cited in the description are hereby incorporated by reference in their entirety. While the disclosure has been described with respect to a limited number of embodiments, those skilled in the art, having benefit of this disclosure, will appreciate that other embodiments can be advised and achieved which do not depart from the scope of the description as disclosed herein.

The invention claimed is:

1. A method for pushing content items, comprising:
obtaining a target text and analyzing lexically the target text;
extracting features, comprising traffic feature, from the target text;
classifying hierarchically, the features extracted from the target text, based on a pre-trained hierarchical classification model considering traffic feature to obtain a hierarchical classification of the target text;
selecting one or more among a plurality of content items based on the hierarchical classification of the target text;

obtaining the selected content items; and
pushing the obtained content items to a terminal;
wherein the target text comprises a webpage text which comprises a traffic feature identifying source of the webpage text;
wherein the plurality of content items comprise a plurality of promotion texts;
  wherein for each of the plurality of promotion texts:
  obtaining the promotion text and analyzing lexically the promotion text;
  extracting features, comprising traffic feature, from the promotion text;
  classifying hierarchically, the features extracted from the promotion text, based on a pre-trained hierarchical classification model considering traffic feature to obtain a hierarchical classification of the promotion text; and
  calculating similarity between the webpage text and the promotion text based on the hierarchical classification of the promotion text and the hierarchical classification of the webpage text,
wherein the selecting one or more among the plurality of promotion texts is based on the similarity between the webpage text and each of the plurality of promotion texts.

2. The method of claim 1, in which the features extracted from the target text further comprise at least one of the following:
token, keyword, topic, general keyword, expanded keyword, named entity of the target text.

3. The method of claim 1, in which the extracting features comprising traffic feature from the target text comprises:
parsing Uniform Resource Locator (URL) of the webpage text; and
determining traffic feature of the webpage text based on the URL.

4. The method of claim 1, in which the target text comprises a user text which comprises a traffic feature identifying source of the user text.

5. The method of claim 4, in which the user text is associated with a user identity and comprises at least one of the following:
a historical search query request item associated with the user identity, a microblog tag associated with the user identity, a webpage title browsed associated with the user identity.

6. The method of claim 1, in which the target text comprises a promotion text which comprises a traffic feature identifying source of the promotion text.

7. The method of claim 1, in which the target text further comprises a user text.

8. The method of claim 7, in which the selecting one or more among the plurality of promotion texts is further based on the similarity between the webpage text and the user text.

9. A computer-based promotion content distribution system, comprising:
a lexical analysis portion configured to obtain a target text and to analyze lexically the target text;
a hierarchical classification portion configured to extract features, comprising traffic feature, from the target text and to classify hierarchically the features extracted from the target text based on a pre-trained hierarchical classification model considering traffic feature to obtain a hierarchical classification of the target text;
a content promotion portion configured to select one or more among a plurality of content items based on the hierarchical classification of the target text, to obtain the selected content items and to push the obtained content items to a terminal;
wherein the target text comprises a webpage text which comprises a traffic feature identifying source of the webpage text;
wherein the plurality of content items comprise a plurality of promotion texts;
wherein the lexical analysis portion is further configured to: for each of the plurality of promotion texts, obtain the promotion text and analyze lexically the promotion text,
wherein the hierarchical classification portion is further configured to: for each of the plurality of promotion texts, extract features comprising traffic feature from the promotion text and classify hierarchically the features extracted from the promotion text based on a pre-trained hierarchical classification model considering traffic feature to obtain a hierarchical classification of the promotion text,
wherein the content promotion portion is configured to:
  for each of the plurality of promotion texts, calculate similarity between the webpage text and the promotion text based on the hierarchical classification of the promotion text and the hierarchical classification of the webpage text; and
select one or more among the plurality of promotion texts based on the similarity between the webpage text and each of the plurality of promotion texts.

10. The system of claim 9, in which the hierarchical classification portion is further configured to extract from the target text at least one of the following features:
token, keyword, topic, general keyword, expanded keyword, named entity of the target text.

11. The system of claim 9, in which the hierarchical classification portion is configured to:
parse Uniform Resource Locator (URL) of the webpage text; and
determine the traffic feature of the webpage text based on the URL.

12. The system of claim 9, in which the target text comprises a user text which comprises a traffic feature identifying source of the user text.

13. The system of claim 12, in which the user text is associated with a user identity and comprises at least one of the following:
a historical search query request item associated with the user identity, a microblog tag associated with the user identity, a webpage title browsed associated with the user identity.

14. A non-transitory computer-readable storage medium storing instructions thereon for execution by at least one processing circuit for pushing content items, the instructions comprising:
obtaining a target text and analyzing lexically the target text;
extracting features, comprising traffic feature, from the target text;
classifying hierarchically, the features extracted from the target text, based on a pre-trained hierarchical classification model considering traffic feature to obtain a hierarchical classification of the target text;
selecting one or more among a plurality of content items based on the hierarchical classification of the target text;
obtaining the selected content items; and
pushing the obtained content items to a terminal;

wherein the target text comprises a webpage text which comprises a traffic feature identifying source of the webpage text;

wherein the plurality of content items comprise a plurality of promotion texts;

wherein for each of the plurality of promotion texts:

obtaining the promotion text and analyzing lexically the promotion text;

extracting features, comprising traffic feature, from the promotion text;

classifying hierarchically, the features extracted from the promotion text, based on a pre-trained hierarchical classification model considering traffic feature to obtain a hierarchical classification of the promotion text; and calculating similarity between the webpage text and the promotion text based on the hierarchical classification of the promotion text and the hierarchical classification of the webpage text, wherein the selecting one or more among the plurality of promotion texts is based on the similarity between the webpage text and each of the plurality of promotion texts.

* * * * *